UNITED STATES PATENT OFFICE.

ARTHUR EICHENGRÜN, OF ELBERFELD, GERMANY, ASSIGNOR TO FARBENFABRIKEN OF ELBERFELD CO., OF NEW YORK, N. Y.

DERIVATIVES OF AROMATIC OXY-ALDEHYDES AND PROCESS OF MAKING SAME.

SPECIFICATION forming part of Letters Patent No. 675,543, dated June 4, 1901.

Application filed August 5, 1899. Serial No. 726,258. (No specimens.)

*To all whom it may concern:*

Be it known that I, ARTHUR EICHENGRÜN, doctor of philosophy, chemist, a citizen of Germany, residing at Elberfeld, Germany, (assignor to the FARBENFABRIKEN OF ELBERFELD COMPANY, of New York,) have invented a new and useful Improvement in the Manufacture or Production of New Derivatives of Aromatic Oxy-Aldehydes; and I hereby declare the following to be a clear and exact description of my invention.

My invention relates to the production of new derivatives of aromatic oxy-aldehydes, which are characterized by the fact that they are substituted by the group $CH_2X$, (X meaning a halogen atom, such as chlorin, bromin, iodin.)

As basis or starting materials for my new process I can employ the oxy-aldehydes of the benzene or naphthalene series, such as salicylic aldehyde, paraoxybenzaldehyde, oxynaphthaldehyde, vanillin,

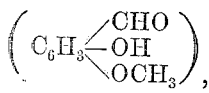

or the like.

In order to produce the above-defined new derivatives, the said starting materials are at first heated with a solution of a halogenmethylic alcohol (such as $CH_2Cl.OH, CH_2Br.OH, CH_2IOH$) in concentrated hydrochloric acid, by means of which operation products are obtained which are substituted by the group $CH_2X$, (X meaning a halogen atom, such as chlorin, bromin, iodin.) By treating these products with water the halogen atom contained therein is replaced by the hydroxy group, the respective haloid acid, (such as hydrochloric, hydrobromic, or hydriodic acid,) being evolved.

The new products are crystalline substances characterized by the fact that they contain the group $CH_2X$, (X meaning a halogen atom,) and that they are transformed by the action of alcohols into bodies containing the group $CH_2.OR$, (R meaning an alkyl radical.) When boiled with glacial acetic acid, they are transformed into compounds containing the group $CH_2.O.CO.CH_3$. They are insoluble in water and soluble in most organic solvents.

In carrying out my new process practically I can proceed as follows, the parts being by weight: A mixture prepared from one hundred and twenty-two parts of salicylic aldehyde and sixty-six parts of chlormethylic alcohol in six hundred parts of concentrated hydrochloric acid is heated for about one hour at from 30° to 50° centigrade while continuously stirring. The liquid is then allowed to stand for about one day at ordinary temperature. Subsequently the crystalline mass which has separated at the bottom of the vessel is isolated by filtration. By a crystallization from acetone it is obtained in the shape of white leaves melting at 88° centigrade. The body thus obtained is one of the above-defined new products, has most probably the formula

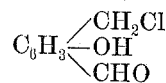

and is adapted for the synthesis of new organic preparations. It is easily soluble in ether, acetone, acetic acid, and chloroform, soluble with difficulty in ligroin, and insoluble in petrolether.

Having now described my invention and in what manner the same is to be performed, what I claim as new, and desire to secure by Letters Patent, is—

1. The process for producing new derivatives of aromatic aldehydes substituted by the group $CH_2X$, X meaning a halogen atom, which process consists in heating aromatic oxy-aldehydes with a solution of a halogenmethylic alcohol in concentrated hydrochloric acid, and isolating the thus-obtained products by filtration, substantially as hereinbefore described.

2. The process for producing a new derivative of salicylic aldehyde having most probably the formula:

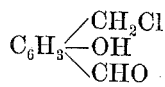

which process consists in heating a mixture prepared from salicylic aldehyde and a solution of chlormethylic alcohol in concentrated hydrochloric acid, and filtering off the thus-obtained new product, substantially as hereinbefore described.

3. The new products from aromatic oxyaldehydes, being crystalline substances characterized by the fact that they contain the group $CH_2X$, X meaning a halogen atom, being transformed by the action of alcohols into bodies containing the group $CH_2.OR$, R meaning an alkyl radical, being transformed by heating with glacial acetic acid into compounds containing the group $CH_2.O.CO.CH_3$, and being insoluble in water but soluble in most organic solvents, substantially as hereinbefore described.

4. The new product obtained from salicylic aldehyde having most probably the formula:

$$C_6H_3{\diagup CH_2.Cl \atop {-OH \atop \diagdown CHO}}$$

being when pure and pulverized a white crystalline powder, melting at 88° centigrade, easily soluble in ether, acetone, acetic acid and chloroform, soluble with difficulty in ligroin and insoluble in petrolether, substantially as hereinbefore described.

In testimony whereof I have signed my name in the presence of two subscribing witnesses.

ARTHUR EICHENGRUN.

Witnesses:
R. E. JAHN,
OTTO KÖNIG.